United States Patent
Ustanik

(10) Patent No.: US 7,762,119 B2
(45) Date of Patent: Jul. 27, 2010

(54) METHOD AND APPARATUS FOR DISTORTION MEASUREMENT IMAGING

(75) Inventor: Correy Robert Ustanik, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 711 days.

(21) Appl. No.: 11/606,768

(22) Filed: Nov. 30, 2006

(65) Prior Publication Data

US 2008/0127713 A1 Jun. 5, 2008

(51) Int. Cl.
*G01B 3/30* (2006.01)
(52) U.S. Cl. ........................................ 73/1.79
(58) Field of Classification Search ............... 73/1.79
See application file for complete search history.

(56) References Cited

U.S. PATENT DOCUMENTS

| 3,786,332 A | 1/1974 | Hepner et al. | 318/577 |
| 2006/0247891 A1 | 11/2006 | Fox et al. | 702/155 |

FOREIGN PATENT DOCUMENTS

| JP | 2007 187707 | 7/2007 |
| WO | WO2006/116356 | 11/2006 |

OTHER PUBLICATIONS

Abstract of Japan JP2007187707, Yoshida Makoto; Seiko Epson Corp.; Jul. 26, 2007.

*Primary Examiner*—Hezron Williams
*Assistant Examiner*—Alex Devito
(74) *Attorney, Agent, or Firm*—Vernon E. Williams; William J. Tucker, Esq.

(57) ABSTRACT

A method of calibrating a measurement an inspection system used in the LCD industry is presented. An assembly is created including two substrates coupled by a transducer. Two fixtures also adhere to the substrates and are connected to an interferometer. An inscription is created by marking at least one of the substrates using a reference point on a support table of the measurement and inspection system as a reference. The transducer is then operated to simulate an LCD glass process such as a thermal process or a glass cutting process. Operating the transducer also generates signals that are measured by the interferometer and represent a first distortion measurement. The inscription is then compared to reference mark to determine a second distortion measurement. A comparison of the first distortion measurement and the second distortion measurement are then used to calibrate the measurement and inspection device.

8 Claims, 4 Drawing Sheets

METHOD AND APPARATUS FOR DISTORTION MEASUREMENT IMAGING

BACKGROUND OF THE INVENTION

1. Field of the Invention

The present invention is directed to distortion measurement of glass substrates.

2. Technical Background

A liquid crystal display (LCD) is a thin flat display device used in conventional television, cellular telephone, computers, etc. Conventional LCD manufacturing techniques are complex and require a variety of integrated technologies. The LCD includes a cover glass substrate and a back glass substrate. The back substrate often includes electronics, such as thin-film transistors (TFTs) that must be aligned between the cover substrate and the back substrate. TFT technology has advanced to the point where each TFT is implemented in a sub-micron area within the LCD. As such, sub-micron accuracy is required when aligning TFTs within the substrates.

During manufacturing a variety of manufacturing operations may uniformly or non-uniformly distort an LCD display. For example, heat treatment often causes compaction and/or distortion. The compaction may be uniform, but the compaction may also be non-uniform. Knowledge of how heat treatment effects the substrate is critical to properly aligning TFTs in an LCD. Therefore, it is necessary to measure compaction and distortion to properly position the TFTs and align the back substrate, the TFT, and the cover substrate.

A variety of conventional stress measurement, compaction measurement, and distortion measurement technologies such as measurement gauges are available for measuring the effects of processing such as heat treatment on substrates. Many of these measurement technologies include a support table with reference markings that are used to inscribe the substrate relative to the reference markings. The substrate is positioned on the support table and inscribed using the reference markings as a guide. A process such as heat treating, cutting, etc is then applied to the substrate. The substrate is then repositioned on the support table and the markings on the substrate are compared to the reference markings on the table to determine changes. Typically a visual system is employed to distinguish the very small changes.

Compaction measurement may be performed on a sample substrate to calibrate conventional measurement technology such as a distortion measurement gauge. Compaction measurement includes measuring the location of grid points inscribed on a sample substrate relative to reference points (i.e., measured value), processing the sample substrate, re-measuring the location of the grid points relative to the reference points (processed value), and determining the difference between the pre-processed and the post-processed grid point locations. The process value is compared against the measured value to determine the accuracy of the distortion measurement. Specifically, the difference between the two grid points is an indication of the amount of compaction or distortion that occurred on the substrate. The compaction or distortion measurements are then used to calibrate the measurement gauge.

A number of issues occur during processing and inhibit operator ability to calibrate a test and measurement system at the level of accuracy required. For example, in the case of heat treatment with a furnace, the accuracy of the measured value is based on three components. The first component is the measurement gauge. The second component is the temperature fluctuations in the furnace, and the third is the variation in the sample substrate. These factors preclude measuring distortion to the required accuracy needed for alignment of modern TFT technology. As a further note, the sample can only be used once. Therefore, when calibrating or determining the accuracy of a measurement gauge, cost and the availability of samples can become an issue.

Thus there is a need for determining the accuracy of a measurement and inspection gauge. There is a need to calibrate a measurement and inspection gauge at the levels of accuracy and with the levels of repeatability required of modern LCD displays that include electronics such as TFTs.

SUMMARY OF THE INVENTION

A reusable substrate assembly is constructed to calibrate a measurement and inspection system, such as a measurement and inspection gauge. In accordance with the teachings of the present invention, the substrate assembly includes two substrates coupled by a piezoelectric device. The piezoelectric device is operated (i.e., resized) to simulate distortion within a glass substrate. A capacitive sensor is integrated into the piezoelectric device to detect the very minute movements that result from operating the piezoelectric device (i.e., transducer).

In accordance with the teachings of the present invention a method is presented in which image-based distortion measurement (i.e., acquired using a vision system, camera, etc) and a transducer distortion measurement (i.e., acquired through the capacitive sensors integrated in the transducer) are used to calibrate a measurement and inspection system. The image-based distortion measurement and the transducer distortion measurement may be used individually or in combination to calibrate the measurement and inspection system. In another embodiment, an interferometer may be used with the image-based distortion measurement and/or the transducer distortion measurement to calibrate a measurement and inspection system. Using the teachings of the present invention the measurement and inspection system may be calibrated to sub-micron accuracy.

A variety of advantages are realized by implementing piezoelectric transducer based distortion measurement to calibrate an LCD measurement and inspection system. Specifically, substantial improvements in the accuracy, repeatability, and reproducibility are realized.

One component of the accuracy is defined by the piezoelectric transducer and the connection apparatus used to attach the piezoelectric transducer to the sample substrate. In accordance with the teachings of the present invention, the accuracy of a piezoelectric transducer may be in the 4 nanometer range. In one embodiment the bonding agent (i.e., adhesive) and connection apparatus produces less than 10 nanometers of measurement accuracy; which simulates near rigid body performance. As a result, the accuracy of a substrate assembly of at least two substrates coupled by two piezoelectric transducers is less than 14 nanometers. The 14 nanometers of error may be accounted for as part of an error budget.

In accordance with the teachings of the present invention, repeatability constraints are also realized. The repeatability of the assembly is dependent on the piezoelectric transducer and the connection apparatus. In accordance with the teachings of the present invention, the repeatability of the piezoelectric transducer is 1 nanometer. The connection apparatus/bonding agent accounts for an additional 10 nanometers of uncertainty for a total of 11 nanometers of error that can be accounted for as part of an error budget. Stability is similar to repeatability. As such, the same substrate assembly is used to track long term trending of the measurement and inspection system.

In one embodiment, a distortion measurement method comprises constructing an assembly, the assembly comprising a first substrate, a second substrate and at least one transducer coupling the first substrate to the second substrate; operating the transducer; and measuring distortion between the first substrate and the second substrate in response to operating the transducer.

In one embodiment, a method of calibrating a measurement and inspection system, the measurement and inspection system comprises a reference table for aligning a substrate and a vision system for imaging the substrate, the method comprising the steps of: implementing the substrate with an assembly, the assembly comprising a transducer coupling a first substrate relative to a second substrate in a first position, the transducer further comprising at least one sensor; inscribing at least one location on the first substrate relative to the reference table, while the assembly is in the first position; generating a first image by imaging the assembly after inscribing the at least one location; operating the transducer thereby moving the first substrate to a second position relative to the second substrate; generating a sensor value reflecting the second position in response to operating the transducer; generating a second image by imaging the assembly in the second position; and calibrating a measurement and inspection system in response to comparing the first image, the second image, and the sensor value.

In one embodiment, a substrate assembly comprises a first substrate; a second substrate; and at least one transducer coupling the first substrate to the second substrate, the at least one transducer comprising a sensor detecting relative motion between the first substrate and the second substrate.

In one embodiment, a distortion measurement method comprises the steps of simulating a single substrate with an assembly, the assembly comprising a first substrate, a second substrate and at least one transducer coupling the first substrate to the second substrate; and calibrating a measurement and inspection system in response to simulating processing of the single substrate.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
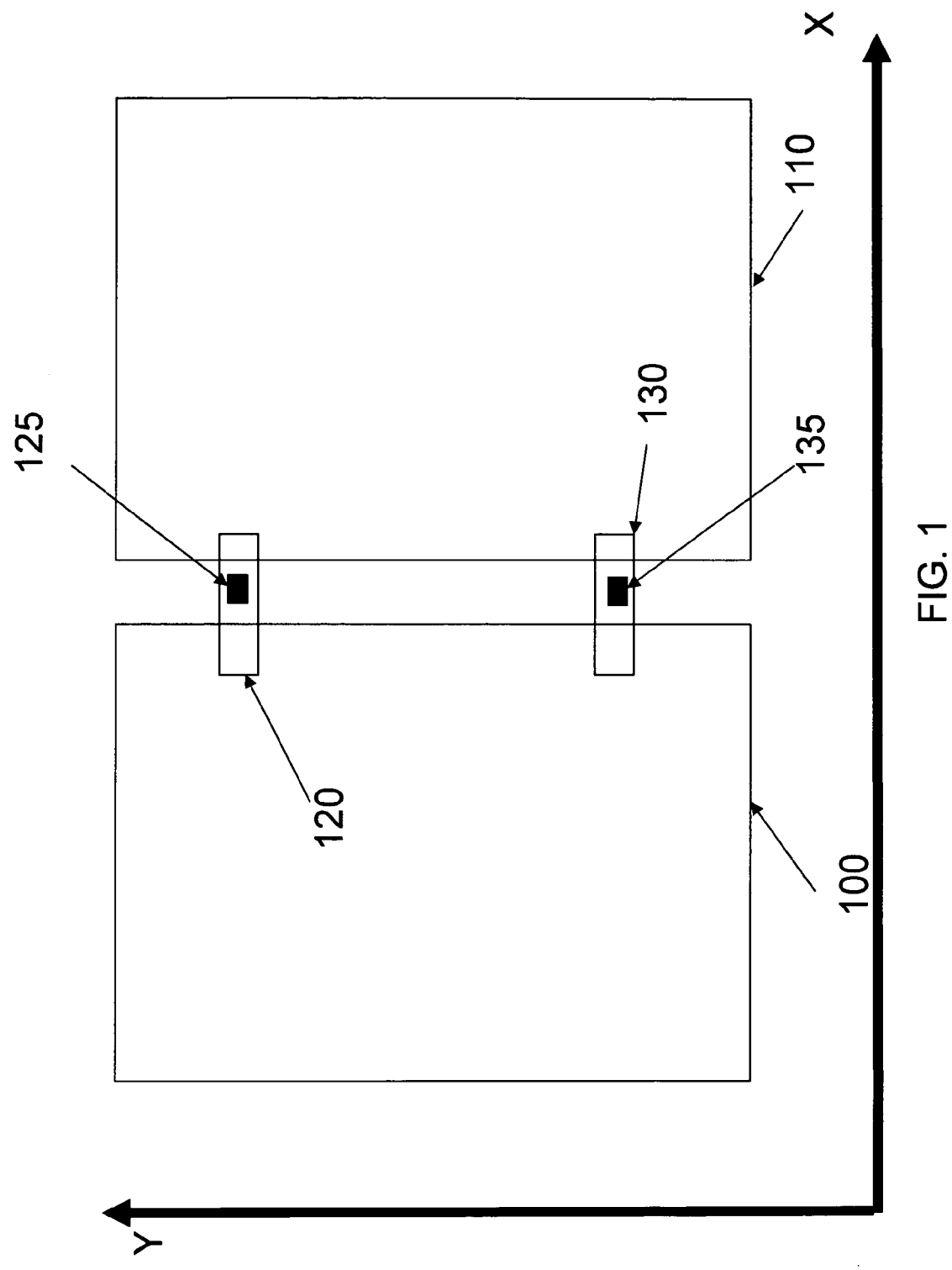
FIG. 1 displays a conceptual drawing of a substrate assembly implemented in accordance with the teachings of the present invention.

In accordance with the teachings of the present invention, a method and apparatus for calibrating an LCD measurement and inspection system is presented. A measurement and inspection system includes any LCD distortion measurement and inspection system used to measure distortion in an LCD glass substrate. In one embodiment, a measurement and inspection system such as one disclosed in A method and apparatus for measuring dimensional changes in transparent substrates, filed Apr. 28, 2005, Publication number 20060247891A1, assigned to Corning Incorporated is incorporated by reference.

In accordance with the teachings of the present invention a substrate assembly is provided. In one embodiment, the substrate assembly includes at least two substrates connected by at least one piezoelectric transducer including at least one sensor. Coupling the substrates with a piezoelectric transducer simulates a single substrate. Connecting the two substrates with the piezoelectric transducers produces a substrate assembly which has rigid body properties that can be used to calibrate a measurement and inspection system. As such, when the substrate is operated the substrate assembly can be used to simulate distortion or other processing in a single substrate. One particular advantage is that when the simulation is complete transducer can be turned off and the substrate assembly is returned back to its original configuration. This facilitates reuse of the substrate assembly and improves the repeatability and accuracy of the measurements, which is extremely important when calibrating a measurement and inspection system at submicron levels of accuracy.

In one embodiment, a method for calibrating a measurement and inspection system is implemented by comparing two distortion measurements. The first distortion measurement is acquired by performing imaging with a vision system to determine relative movement before and after processing a sample substrate (i.e., image-based distortion measurement). Imaging may include taking a picture of the substrate and processing the image. The second distortion measurement is acquired from a sensor coupled to the piezoelectric transducer (transducer distortion measurement). In another embodiment, a third distortion measurement may be used in combination with the first and second distortion measurements to calibrate a measurement and inspection system. The third distortion measurement is acquired using an interferometer (i.e., interferometer distortion measurement).

A first distortion measurement is generated by measuring relative movement of an inscription on a substrate assembly using a vision system (i.e., image based distortion measurement). In the first distortion measurement a pre-processing and post-processing image is taken of an inscription on a sample substrate and the relative movement of the inscription is representative of distortion in the sample substrate. The second distortion measurement is generated by operating a transducer coupling two substrates (i.e., substrate assembly or rigid body assembly) and then using a capacitive sensor integrated into the transducer to detect the changes between the two substrates (i.e., transducer distortion measurement). In the second distortion measurement, the sensor reading represents the amount of movement between the two substrates (i.e., expansion, contraction). The movement between the two substrates (i.e., substrate assembly) simulates distortion, compaction, etc in a single substrate. The transducer distortion measurement may then be compared to the image-based distortion measurement and used to calibrate the inspection and measurement system. In a third distortion measurement, an interferometer is connected to each substrate in the substrate assembly and the relative movement of the two substrates is measured by the interferometer. The third distortion measurement may then be compared to the image-based distortion measurement, the transducer distortion measurement, or both. In accordance with the teachings of the present invention, all three distortion measurements may be used in various combinations and permutations to calibrate the substrate.

FIG. 1 displays a conceptual drawing of a substrate assembly implemented in accordance with the teachings of the present invention. In one embodiment, the substrate assembly is implemented to simulate a single reusable substrate. In addition, operating the transducers may simulate processing of the substrate such as heat treatment processing, cutting the substrate, etc, without actually having to perform these processing functions.

As shown a first substrate 100 and a second substrate 110 is coupled together using a first piezoelectric transducer 120 including an integrated capacitive sensor 125 and a second piezoelectric transducer 130 including an integrated capacitive sensor 135. In one embodiment, the substrate assembly shown in FIG. 1 includes at least two substrates coupled together with at least one piezoelectric transducer, however, it should be appreciated that a variety of permutations and combinations including a number of substrates, piezoelectric transducers, and sensors may be combined and are within the scope of the present invention.

The piezoelectric transducer (120, 130) converts electrical energy directly to mechanical energy. During operation an electric field is applied to the piezoelectric transducer (120, 130) and a physical deformation of the transducer (120, 130) occurs based on solid state dynamics of the piezoelectric transducer material. As such, applying an electrical field to the piezoelectric transducer causes the piezoelectric transducer to shrink or expand proportionally with the magnitude of the electrical field. The active element in a piezoelectric transducer is a polarized material (i.e., material including positively charged regions and negatively charged regions). When an electric field is applied across the polarized material, the polarized molecules align themselves with the electric field, resulting in induced dipoles within the molecular or crystal structure of the polarized material. This alignment of molecules causes the material to change dimensions.

A sensor (125, 135) is coupled to each piezoelectric transducer (120, 130). In one embodiment, a reading (i.e., value) may be taken of the sensor (125, 135). An increase in value or a decrease in value may correspond to a change in relative position of the substrates (100, 110) with respect to each other. For example, a positive change in value may increase the spacing between the two substrates (100, 110) and move the substrates (100, 110) from a first position to a second position relative to each other. A negative change in value may decrease the spacing between the two substrates (100, 110) and move the substrates (100, 110) from a first position to a second position relative to each other.

Current Piezoelectric transducers can accommodate movement of several 100 μm with resolutions in the sub-nanometer range. In addition, piezoelectric transducers implemented in accordance with the teachings of the present invention can react in a matter of microseconds with acceleration rates of more than 10,000 g. In addition, piezoelectric transducers do not have any moving parts since their displacements are based on solid state dynamics. As a result, piezoelectric transducers do not show wear and tear so the accuracy is not diminished.

In accordance with the teachings of the present invention an electrical field may be applied to the first piezoelectric transducer 120 or to piezoelectric transducer 130. In a first embodiment, applying the same electrical field to both the first piezoelectric transducer 120 and the second piezoelectric transducer 130 would uniformly increase both transducers and result in a uniform movement and spacing between the first substrate 100 and the second substrate 110. This would simulate uniform distortion of a single substrate using the substrate assembly depicted in FIG. 1. In a second embodiment, a different electrical field may be applied to each piezoelectric transducer (120, 130) creating a non-uniform displacement or torqueing rotation between the first substrate 100 and the second substrate 110. This may simulate non-uniform heating or non-uniform distortion of a single substrate. The second embodiment may also be used to simulate and introduce stresses in a substrate (100, 110). In a third embodiment, the magnitude and time of the electrical field may be varied between the first piezoelectric transducer 100 and the second piezoelectric transducer 110. As such, stresses may be simulated between the first substrate 100 and the second substrate 110 resulting from non-uniform deformation.

Figure 2:
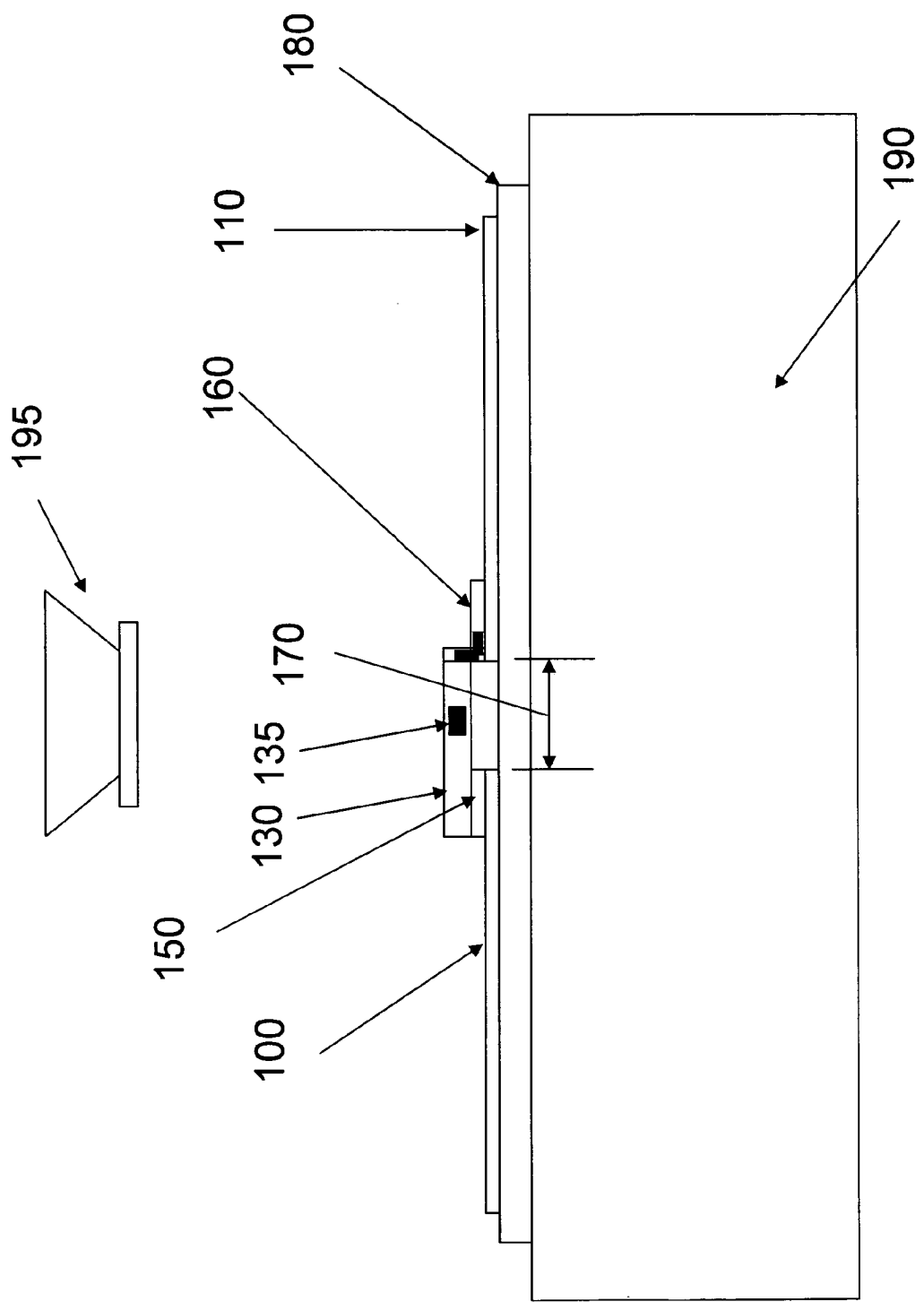
FIG. 2 displays a side view of a measurement and inspection system implemented in accordance with the teachings of the present invention.

FIG. 2 displays a side view of a measurement and inspection system implemented in accordance with the teachings of the present invention. As shown in FIG. 2 the piezoelectric transducer 130 is mounted on a spacer 150 which connects the piezoelectric transducer 130 to the substrate 100. In one embodiment, the spacer 150 is connected to the piezoelectric transducer 130 and to the substrate 100 using an adhesive. In one embodiment, the spacer 150 is implemented to keep the piezoelectric transducer 130 in a static relationship relative to the substrate 100.

The piezoelectric transducer 130 is also connected to the substrate 110 using an L-bracket 160. The L-bracket 160 and piezoelectric transducer 130 are connected to a substrate 110 using an adhesive. The height of the L-bracket 160 is adjusted so that the bottom of the L-bracket 160 uniformly engages the substrate 110. In one embodiment, the nominal gap 170 between the first substrate 100 and the second substrate 110 is 1 mm. The spacer 150, the piezoelectric transducer 130, and the L-bracket 160 combine to form the a connection apparatus. It should be noted that bonding agents such as an adhesive are used to secure the spacer 150 between the substrate 100 and the piezoelectric transducer 130; between the piezoelectric transducer 130 and the L-bracket; and between the L-bracket and the substrate 110. The measurement and inspection gauge shown in FIG. 2 also includes a housing 190 that supports a vacuum table 180. The top of the vacuum table shown in FIG. 3 includes reference markings used to inscribe substrates that are positioned on the vacuum table 180. In addition, the vacuum table 180 is used to hold each substrate (100, 110) in position using suction and hold the substrate assembly (100, 110, 130) in position using suction. Imaging of the substrates (100, 110) are performed using a vision system 195. In one embodiment, the vision system 195 may be any system capable of taking an image. In a second embodiment, the vision system 195 may be any system capable of taking an image and then processing the image.

An error budget is defined for the combination of the spacer 150, the transducer 130, the L-bracket 160, and the adhesives used to connect these elements together. In one embodiment the error budget for the foregoing element (i.e., spacer 150, the transducer 130, the L-bracket 160, and the adhesives) should produce an accuracy of about 0.2 um with a repeatability of 0.1 um @3σ.

In accordance with the teachings of the present invention, at least one transducer 130 is connected to the substrate 100 using the spacer 150. At least one piezoelectric transducer 130 is mounted to the spacer 150 and will be bonded to substrate 100 using an adhesive. The bonding adhesive creates a margin of error in the measurement and therefore should be chosen carefully and applied in a manner that reduces the error margin in any measurements. A right L bracket 160 is attached to the right face of the transducer. The bonding adhesive to the right L bracket creates a margin of error in the measurement and therefore should be chosen carefully and applied in a manner that reduces the error margin in any measurements. The height of the L-bracket 160 is adjusted so that it buttresses the piezoelectric transducer 130. The bottom surface of the L-bracket 160 uniformly engages the substrate 110 and is bonded to the substrate 110 using an adhesive. The nominal gap between the first substrate 100 and the second substrate 110 will be 1 mm.

In one embodiment, the combination of the substrate 100, the substrate 110, the spacer 150, the transducer 130, and the L-bracket 160 form a substrate assembly. In a second embodiment, the combination of the substrate 100, the substrate 110, and the transducer 130 form a substrate assembly. The two substrates (100, 110) connected by at least one piezoelectric transducer 130 is considered a rigid body assembly. A vision system 195 is shown positioned to take an image of the substrate assembly (i.e., 100, 110 and 130).

During operations a vacuum is applied to the substrate assembly. The vacuum holds the substrate assembly in place. The vacuum table has various markings (reference markings). Both substrates (100, 110) are inscribed (i.e., marked) relative to the reference markings on the vacuum table 180. The vision system 195 is then used to take an image of the inscriptions. A reading of sensor 135 is also performed as a baseline measurement. The vacuum is then turned off allowing both substrates (100, 110) to float. When both substrates are floating the transducer 130 is actuated to emulate expansion or contraction of the substrates (100, 110). Both substrates (100, 110) are then re-positioned on the vacuum table 180 close to where they were located during the first measurement (i.e., the inscriptions and the markings on the vacuum table are aligned). The substrate assembly is then vacuumed down. A second reading of the sensor 135 is performed. The vision system 195 is then used to take a second image of the inscriptions and the vacuum table markings. During the second measurement the inscribed area on the substrate is compared to the markings on the vacuum table 180. In one embodiment, a first distortion measurement is performed using the vision system 195 (i.e., visual distortion). In a second embodiment, the measurement is performed with the sensor 135 integrated in the transducers (i.e., transducer distortion). In a third embodiment, a combination of the visual distortion and the transducer distortion are taken. In accordance with the teachings of the present invention, the two distortion measurements are combined to calibrate the measurement and inspection system. For example, the transducer distortion is compared to the visual distortion to calibrate the measurement and inspection system.

In one embodiment, rigid body compensation is used to determine the error in the measurements taken with the vision system. Rigid body compensation is used to remove the first order phenomena of the measurement such as translation and rotation. In one embodiment, the rigid body compensation is performed by calculating the rotation and translation that minimizes any residual error.

Figure 3:
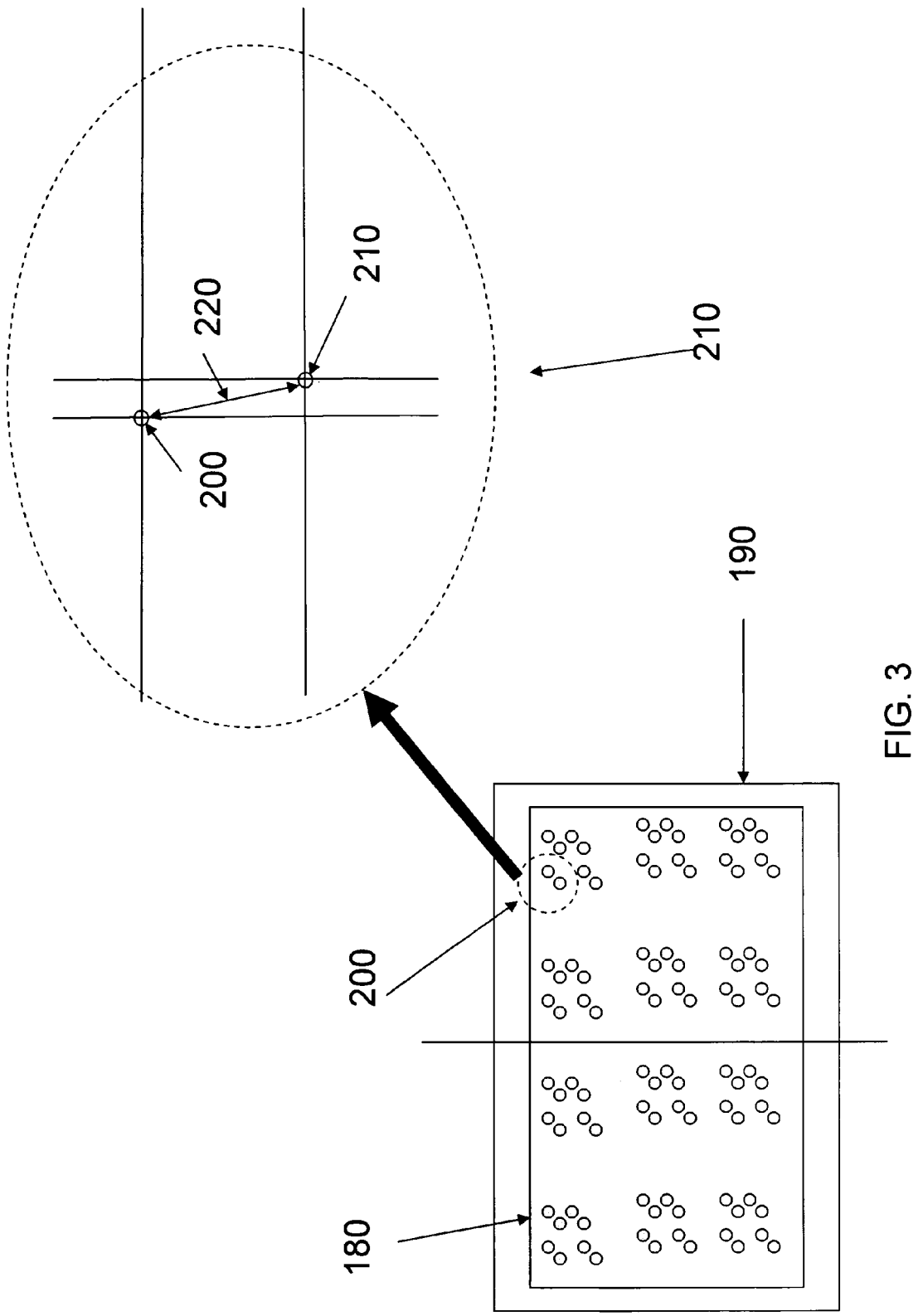
FIG. 3 displays a measurement node implemented in accordance with the teachings of the present invention.

As previously mentioned, a sample substrate is inscribed with markings using a reference surface. A process is performed on the sample substrate and the markings are then compared with the reference surface. FIG. 3 displays a measurement node implemented in accordance with the teachings of the present invention. The location of the inscription during the first measurement is shown as 200. The inscription during the second measurement after a process is shown as 210. The first measurement 200 and the second measurement 210 are also referred to as fiducials. Fiducials (i.e., reference markings on the vacuum table used to mark the substrate) are shown in an expanded view 210. The difference between the first fiducial 200 and the second fiducial 210 is shown as measurement node 220. In one embodiment, the first fiducial 200 represents a location on the substrate that is inscribed on a glass substrate during the first measurement (i.e., prior to processing activity—pre-processing). The second fiducial 210 represents the location that is inscribed on a glass substrate during the second measurement (i.e., after the processing activity—post-processing). During the first and second measurement the transducers are activated to simulate processing. Therefore, the measurement node 220 (i.e., the difference between the first fiducial 200 and the second fiducial 210) represents the change in the substrate due to distortion.

One key to accurate and repeatable results between the two measurements is to be able to compensate for any misalignments that occurred between the first and the second measurements (i.e., rigid body compensation). For example, when placing the substrate assembly on the vacuum table for the second measurement (i.e., after processing), it is impossible to put the substrate assembly in exactly the same position. It is therefore, necessary to compensate by rotating and translating the measurement node 220 (i.e., measurement vector). The typical image detected by a vision system consists of a pair of inverted contrast cross hair, the top left (i.e., 200) corresponding by convention to a reference plate (i.e., reference markings on the vacuum table) and the bottom right (i.e., 210) to a sample substrate.

Rigid body compensation starts with a set of coordinates in space that correspond to the reference plate points (i.e., vacuum table reference points or a reference substrate that is placed on the vacuum table), to the first measurement, and to the second measurement points:

Points on the reference plate: $R_i$ (for i=1 to # points on a reference grid)

Measurement points, first measurement: $M1_i$

Measurement points, Second measurement: $M2_i$

Knowing that the second measurement points are equal to a rotation and translation of the first measurement, we get:

$$M2_i = (ROT+I)M1_i + Tr + Def_i \qquad (1)$$

1. Where
2. ROT is a 2×2 rotation matrix
3. I is the unity matrix
4. Tr is a translation vector
5. $Def_i$ is the deformation vector (i.e., measurement node) that occurred between both measurements @ node i The absolute position of the points is not known accurately. The absolute position vectors R and M depend on the coordinate of the translation stages that are used to translate the vision system from one node to the next one so that the uncertainty of the absolute coordinates is in the range of a few microns. The only information that is accurate is the relative position between the relative points and the absolute points:

$$\text{Relative position at first measurement:} RP1_i = M1_i - R_i \qquad (2)$$

$$\text{Relative position at second measurement:} RP2_i = M2_i - R_i \qquad (3)$$

By implementing equation (1) into equations (2) and (3):

$$RP2_i - RP1_i = ROT\, M1_i + Tr + Def_i \qquad (4)$$

Subtracting the second measurement and first measurement relative vectors results in a field of vectors that is equal to a rotation and a translation of the absolute coordinates of the measured points plus a residual field of vectors that correspond to the plate deformation.

It should be appreciated that equation (4) uses the information of the relative positions (RP2 and RP1 vectors) as well as the absolute point positions in world coordinates (M1). Both fields of vectors (absolute and relative) may be used in different reference frames, respectively linked to the vision system (i.e., CCD camera) for the relative coordinates and linked to the system translation stages for the absolute coordinates. As a consequence, although the measurement is made relative to a reference plate, a minimum degree of accuracy is required of the absolute position to facilitate rigid body compensation.

With the foregoing assumptions, the algorithm of the rigid body compensation can be summarized as follows:

First Measurement:
a. For each node I, measure the vector (i.e., measurement node) joining the center of the reference cross to the centre of the measurement cross. This measurement is made in the CCD reference frame only.
   i. $RP1_i = M1_i - R_i$
b. For each node I, measure the world coordinate of the measured points.
   i. $M1_i = Mot_i + CCD_i$
   ii. Were
   iii. $Mot_i$ is the translation stage position when the image @ node I has been acquired
   iv. $CCD_i$ is the position of the measured point on the CCD Second Measurement:
a. For each node I, measure the vector joining the centre of the reference cross to the centre of the measurement cross. This measurement is made in the CCD reference frame only.
   i. $RP2_i = M2_i - R_i$ Results Post Processing According to the equation 1.2, calculate the best rotation matrix ROT and translation vector Tr that minimizes the root-mean-square (RMS) sum on all nodes:

$RMS(RP2_i - RP1_i - ROT\,M1_i - Tr)$ to be minimized

A deformation field of vectors is then defined by the equation:

$$Def_i = RP2_i - RP1_i - ROT\,M1_i - Tr$$

Figure 4:
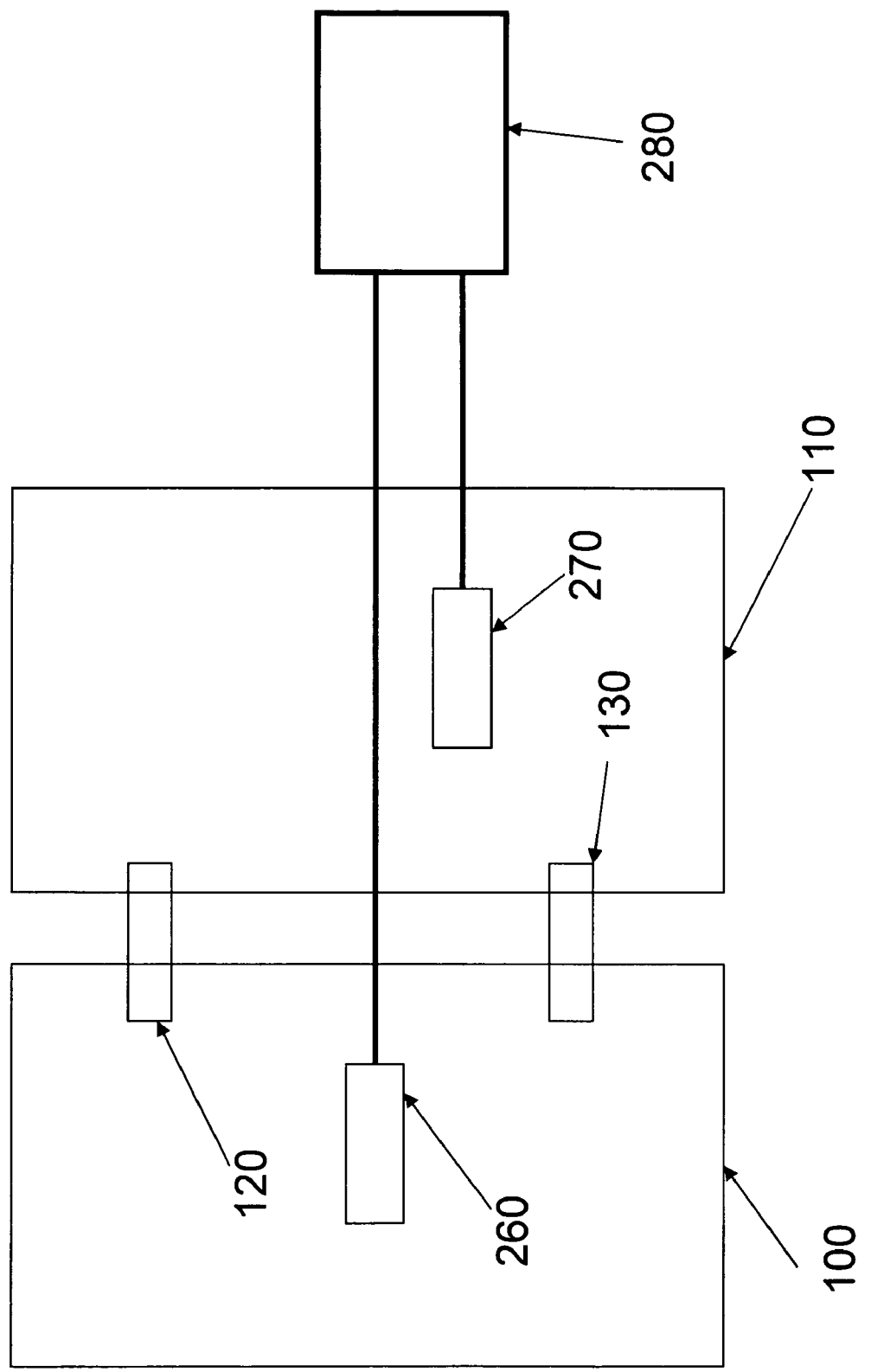
FIG. 4 displays conceptual drawing of another embodiment of a substrate assembly implemented in accordance with the teachings of the present invention.

FIG. 4 displays an embodiment of the present invention. As shown a first substrate 100 and a second substrate 110 are joined using a first piezoelectric transducer 120 and a second piezoelectric transducer 130. A corner cube 260 is positioned on the first substrate 100 and a corner cube 270 is positioned on the second substrate 110. The corner cubes 260 and 270 are fixture devices that are attached to each of the substrates (100, 110) using an adhesive. In one embodiment, a corner cube 260 or 270 is any device that adheres to the substrate (100, 110) and moves relative to the substrate to provide a reading to the interferometer. For example, a corner cube (260, 270) may be implemented by adhering a reflector to the substrate (100, 110) to reflect light from the interferometer.

The corner cubes are connected to an interferometer 280. The corner cubes generate signals proportional to the amount of movement. The interferometer works on the principle of constructive and destructive interference. Two signals that coincide with the same phase will add to each other while two waves that have opposite phases will cancel each other, assuming both have the same amplitude. Using the two signals generated by the cubes results in a very precise measurement of the movement of the two substrates.

During operation an electrical field may be applied to the first piezoelectric transducer 120 or to the second piezoelectric transducer 130. In a first embodiment, applying the same electrical field to both the first piezoelectric transducer 120 and the second piezoelectric transducer 130 would uniformly increase both transducers and result in a uniform movement and spacing between the first substrate 100 and the second substrate 110. This would simulate uniform distortion of the substrate. The measurement from the interferometer 280 in combination with the measurement from the transducer 120 and 130 may be used to calibrate a measurement and inspection system. In another embodiment a visual distortion measurement and/or the measurement from the interferometer 280 may be used in combination with the measurement from the transducer 120 and 130 to calibrate a measurement and inspection system.

In a second embodiment, a different electrical field may be applied to each piezoelectric transducer creating a non-uniform displacement or torqueing rotation between the first substrate 100 and the second substrate 110. This may simulate non-uniform heating and non-uniform distortion of a substrate. This second embodiment may also be used to simulate stresses in the substrates. In a third embodiment, the magnitude of the electrical field and the time used to vary the electrical field may be varied between the first piezoelectric transducer 100 and the second piezoelectric transducer 110. As such, the stresses may be simulated between the first substrate and the second substrate resulting from non-uniform deformation. The measurement from the interferometer 280 in combination with the measurement from the transducer 120 and 130 may be used to calibrate a measurement and inspection system. In another embodiment a visual distortion measurement and/or the measurement from the interferometer 280 may be used in combination with the measurement from the transducer 120 and 130 to calibrate a measurement and inspection system.

Throughout this application, various publications are referenced. The disclosures of these publications in their entireties are hereby incorporated by reference into this application in order to more fully describe the compounds, compositions, and methods described herein.

It should also be understood that while the present invention has been described in detail with respect to certain illustrative and specific aspects thereof, it should not be considered limited to such, as numerous modifications are possible without departing from the broad scope of the present invention as defined in the appended claims.

What is claimed is:

1. A distortion measurement method for calibrating a liquid crystal display (LCD) measurement and inspection system, the distortion measurement method comprising the steps of:
   providing an assembly to simulate a single glass substrate, the assembly comprising a first substrate, a second substrate and at least one transducer coupling the first substrate to the second substrate, where the first substrate and second substrate when coupled to one another are located adjacent to one another so that both are positioned on and contact a reference table associated with the LCD measurement and inspection system;
   operating the transducer to cause distortion between the first substrate and the second substrate; and
   measuring the distortion between the first substrate and the second substrate in response to operating the transducer, wherein the transducer further comprising a sensor and wherein the step of measuring the distortion further comprises a step of reading a value from the sensor.

2. The distortion measurement method as set forth in claim 1, further comprising the step of inscribing the first substrate thereby creating an inscription on the first substrate, operating the transducer, comparing the inscription in response to operating the transducer and performing the step of measuring the distortion in response to comparing the inscription.

3. The distortion measurement method as set forth in claim 1, the first substrate further comprising a first corner cube generating a first signal in response to operating the transducer and the second substrate further comprising a second corner cube generating a second signal in response to operating the transducer, wherein the step of measuring the distortion is performed in response to operating the transducer and in response to comparing the first signal to the second signal.

4. The distortion measurement method as set forth in claim 1, wherein the step of measuring the distortion comprises the step of performing rigid body compensation.

5. The distortion measurement method as set forth in claim 1, wherein the step of measuring the distortion comprises the step of comparing a sensor measurement with an imaging measurement.

6. The distortion measurement method of claim 1, wherein the transducer is a piezoelectric transducer and the sensor is a capacitive sensor.

7. The distortion measurement method of claim 1, further comprising a step of turning-off the transducer to have the assembly return back to an original configuration.

8. The distortion measurement method of claim 1, wherein the operating step further includes operating the transducer to simulate heat treatment processing or cutting of the single glass substrate.

* * * * *